United States Patent
Granirer, deceased et al.

[15] 3,671,627

[45] June 20, 1972

[54] REACTION PRODUCTS OF PLACENTA EXTRACTS AND PENICILLIN

[72] Inventors: Louis W. Granirer, deceased, late of Belle Harbor, N.Y.; by Minna B. Granirer, executor; by Samuel Granirer, executor, both of Belle Harbor, N.Y.; by Robert I. Pearlman, executor, Elizabeth, N.J.

[73] Assignee: Minna B. Granirer, Belle Harbor, N.Y.

[22] Filed: June 5, 1969

[21] Appl. No.: 830,884

Related U.S. Application Data

[60] Division of Ser. No. 701,465, Nov. 7, 1967, Pat. No. 3,584,117, which is a continuation-in-part of Ser. Nos. 113,059, May 29, 1961, abandoned, and Ser. No. 299,114, July 31, 1964, abandoned.

[52] U.S. Cl. .............................. 424/105, 424/95, 424/271
[51] Int. Cl. .................................. A61k 21/00, A61k 17/00
[58] Field of Search ........................................ 424/105, 95, 271

[56] References Cited

UNITED STATES PATENTS 2,907,695   10/1959   Adam et al. ............................. 424/95

*Primary Examiner*—Sam Rosen
*Attorney*—Robert I. Pearlman

[57] ABSTRACT

The present invention relates to new penicillin formulations formed by contacting penicillin and pharmaceutically acceptable salt complexes formed from extracts of placenta.

12 Claims, No Drawings

REACTION PRODUCTS OF PLACENTA EXTRACTS AND PENICILLIN

The present application is a divisional application of Ser. No. 701,465, filed Nov. 7, 1967 now U.S. Pat. No. 3,584,117, which in turn is a continuation-in-part of now abandoned applications Ser. Nos. 113,059 and 299,114, filed May 29, 1961 and July 31, 1964, respectively, all in the name of Louis W. Granirer.

U. S. Pat. No. 2,907,695, issued Oct. 6, 1959, (corresponding to Canadian Pat. No. 655,328) to Elizabeth Adam and Louis W. Granirer, describes a composition derived from placenta and having useful pharmaceutical properties. The present invention relates to, and represents further advancements in, work in the art of said patent.

According to U. S. Pat. No. 2,907,695, medicinal values are derived from the human placenta by contacting the placenta in finely divided form with an acidic, aqueous alcohol solvent to dissolve from the placenta an extract, and base is added to the solvent containing the extract, to precipitate the medicinal values herein referred to as placenta-derived material. This material is useful for relieving the pains and symptoms of rheumatoid arthritis. The structural formula for the placenta-derived material is not known. It is, however, believed to be a magnesium phosphate complex of crystal structure and analysis as is set forth in the said patent.

In parent application, U. S. Ser. No. 701,465, a new type of placenta-derived material is obtained and the yield of the placenta-derivable material increased by adding a salt, preferably an alkali or alkaline earth metal salt, to the solvent containing placenta extract dissolved therein so that there is obtained a complex of the salt and ingredients of the placenta extract. The complex so derived is similar in pharmaceutical activity to the placenta-derived material of said patent.

It has now been found that improved pharmaceutical substances can be obtained by reacting the placenta-derived material of said patent and/or the placenta derived material of the foregoing parent application, with penicillin. The resulting substance is distinctive in that it retains the pharmaceutical effectiveness of the penicillin, while accommodating the penicillin for administration to patients who are allergic to penicillin when administered in any of its usual forms. The composition of the present invention can be used for animal or human therapy.

PROCESS OF RECOVERY ACCORDING TO PARENT APPLICATION

In the recovery of medicinal values from placenta by contacting the placenta with an acidic solvent, such as an acidic, aqueous alcohol solution, to provide a solution of an extract of the placenta dissolved in the solvent and leave a portion of the placenta undissolved as placenta residue, the improvement has been taught of admixing with extract a salt, preferably inorganic, of an alkali metal or alkaline earth metal, to form with the ingredients of said extract a pharmaceutically acceptable salt complex. The salt complex has a medicinal value substantially similar to that of the magnesium phosphate complex derived by precipitating same from an acidic, aqueous ethanol solution of such extract by the addition of base.

The various alkali metal and alkaline earth metal salts, both organic and inorganic, may be employed. Examples thereof are: potassium chloride, potassium gluconate, potassium tribasic phosphate, potassium dibasic phosphate, potassium bicarbonate, potassium citrate, potassium salicylate, potassium lactate, sodium dibasic phosphate, sodium lactate, sodium salicylate, sodium tribasic phosphate, sodium benzoate, sodium bicarbonate, sodium chloride, sodium citrate, sodium sulphate, calcium gluconate, calcium lactate, calcium dibasic phosphate, calcium tribasic phosphate, calcium carbonate, calcium citrate, calcium levulinate, calcium mandelate, calcium methionate, calcium chloride, calcium salicylate, magnesium dibasic phosphate, magnesium tribasic phosphate, magnesium lactate, magnesium carbonate, magnesium citrate, magnesium salicylate, magnesium thiosolfate, magnesium trisilicate, strontium lactate, strontium citrate, strontium carbonate, strontium phosphate tribasic, strontium salicylate.

Magnesium phosphate is especially preferred. The phosphate salts are particularly desirable. Best results have been obtained with dibasic magnesium phosphate ($MgHPO_4 \cdot 3H_2O$). With tribasic magnesium phosphate ($Mg_3(PO_4)_2 \cdot 5H_2O$), upon parenteral administration, of the medicinal values, some inflammation occurs in the areas of administration. So far as has been determined the medicinal values obtained when dibasic magnesium phosphate is used, is the same in pharmaceutical effect. It is however of less potency. On a weight basis, about 60–70, e.g. 65, parts of the dibasic magnesium phosphate complex is equivalent to 15 parts of the magnesium phosphate complex of the said patent, as the complex is disclosed in FIG. 1 thereof. The pharmaceutical effects observed have been the same and the materials, on visual observation, appear to be the same.

The medicinal values provided by use of the new process are termed "pharmaceutically acceptable salt complexes," e.g., those formed by addition of dibasic magnesium phosphate being called "dibasic magnesium phosphate complexes," this indicating the derivation, or more generally "-magnesium phosphate complexes". The latter term is also used to generically denote the product of said patent, such as the product shown in FIG. 1 thereof, although the materials formed in accordance with the present invention are distinct from those formed by the process of U. S. Pat. No. 2,907,695.

In somewhat more detail, the finely divided placenta is contacted with a suitable solvent, which can be acidic, aqueous methyl alcohol or acidic, aqueous ethyl alcohol, or other solvent suitable to yield the placenta-derived material of said patent. A 75 percent ethyl alcohol, 25 percent water mixture can be used, and the acidic condition can be provided by addition of hydrochloric or sulfuric acid. The initial pH can be about 2.7. Following the contacting, which can be for about 2 hours at 20°–30° C., the admixture can be allowed to stand in the cold to permit protein material to precipitate out. A holding period of 4–5 hours at 0° C. is recommended. This step of holding in the cold is not essential and can be omitted. After the contacting and holding step, if any, the solution having the extract dissolved therein is separated from the undissolved matter. The salt, e.g., an alkali metal or alkaline earth metal salt, can be added to the separated solution, or, alternatively, precipitation of medicinal values can be effected as is described in said patent and thereafter the inorganic salt can be added.

In the former case, following separation of the solution of extract in the solvent from undissolved matter, the alkali or alkaline earth metal salt can be added to the acidic solution, and thereafter a base, such as ammonium hydroxide or alkali metal hydroxide can be added to raise the pH to about 9–10, e.g., 9.6. The medicinal values then precipitate. Recovery and working up can be as is described in the aforesaid patent.

In the alternative procedure, medicinal values as magnesium phosphate complex are recovered by adding base to the solution of extract in acidic solvent to precipitate the values, as is described in said patent, and this provides a treated solution which contains extract derived from the placenta as a solute therein, the extract being that which is not precipitated following addition of the base. Alkali or alkaline earth metal salt is then admixed with extract of the treated solution, and this provides a salt complex as medicinal values in addition to that obtained by the addition of base.

Following addition of base to the acidic solution of extract, the precipitate of magnesium phosphate complex can be separated from the treated solution, and the treated solution can then be subjected to evaporation to remove the solvent. Extract is deposited from the solution during the evaporation and this is of a pasty consistency. The extract can be dissolved in water and the salt can be added to the solution. Apparently, the salt dissolves and simultaneously the medium becomes cloudy, and then the precipitate forms, this being a salt complex constituting medicinal values of the placenta. This precipitate can be separated and worked up as was done in recovery of magnesium phosphate complex according to said patent. Thus it is to be clearly understood that the phrase "mixing of extract of treated placenta solution with salt" encompasses mixing the salt directly with the extract, or first removing solvent to recover the solute-extract and then adding the salt to a solution prepared from same.

The amount of salt, e.g., as dibasic magnesium phosphate, can be 10–5,000, preferably 100–3,000, especially 1,000 weight percent of the extract (solute) separated from the treated solution during the evaporation, or equivalent molar amount of other salt. When the first-mentioned procedure is employed, i.e., when the salt is added to the acidic solvent having extract dissolved therein, the amount of salt can be an amount corresponding to the just mentioned amounts, i.e., the amount which would be used if the other procedure were followed.

In the practice of the improved method, temperature and pressure are not critical. The improvement can be realized by merely adding the salt to a suitable medium in which the salt is soluble and the extract is dissolved.

While the placenta used in said patent is human placenta, mammal placenta in general can be used. Cow placenta has been found satisfactory. The cow placenta has been used as a source of the medicinal values and the product derived therefrom is suitable for human therapy. Good yields are obtained from the cow placenta.

COMBINATIONS WITH PENICILLIN

The present invention provides, as novel substances, the reaction product of contacting penicillin and a complex of a salt and an acidic, aqueous ethanol soluble placenta extract.

The novel combinations with penicillin can be combinations of penicillin, and placenta medicinal values as disclosed by U.S. Pat. No. 2.907,695, or placenta medicinal values as derived according to the preceding description encompassed in the parent application. When combined with the materials derived by the procedures of the parent application, the dibasic phosphate salt complexes or the tribasic phosphate salt complexes are preferred.

The penicillin can be in any of its usual forms or can be penicillin as such. Procaine penicillin G is suitable.

The combination with penicillin can be made by contacting penicillin with a pharmaceutically acceptable salt complex of an extract of placenta, such as is described hereinbefore; or in U. S. Pat. No. 2,907,695. Both are basically derived by contacting placenta with an acidic solvent and forming a complex therefrom.

The proportion of the components of the combination can be 2 to 30 mg., preferably 10 to 20 mg., of magnesium phosphate complex according to U.S. Pat. No. 2,907,695 (i.e., of the crystals as shown in FIG. 1 of U.S. Pat. No. 2,907,695), or a corresponding amount of dibasic magnesium phosphate complex as is produced in Example 1, above (i.e., about 4 times as much dibasic complex as the complex of said patent), per 300,000 units of penicillin. If a salt complex other than the dibasic magnesium phosphate complex is used, the amount can be the molar equivalent of the amounts mentioned herein for the magnesium phosphate complex.

Temperature and pressure are not critical. The medicinal values of the placenta dissolved in a suitable medium such as an aqueous medium, are merely added to the penicillin contained in a suitable medium. If the penicillin is in an aqueous medium as a slurry, upon stirring of the admixture of the ingredients, the penicillin goes into true solution, indicating that reaction occurs during the contacting.

The combination of placenta values and penicillin can be administered parenterally, e.g., intramuscularly, to patients sensitive or allergic to penicillin therapy. Upon such use of the combination in clinical testing with patients having a history of penicillin allergy, including allergy to dimethoxyphenyl penicillin, therapeutic responses characteristic for penicillin, without any allergic reactions, were realized.

The dosage in terms of units in penicillin and the frequency of administration can be as is the practice for penicillin alone. An advantage of the combination, however, is that the new penicillin combination is longer acting than the penicillin used in making the combination. The combination has been effective within 1 hour after administration and effectiveness has continued for 2 – 3 days.

In particular, the combination has been used effectively, with no allergic reaction, on patients having penicillin allergy history, in cases of sore throat, infection of the leg, acute otitis media, severe upper respiratory infection, a leg ulcer, and carbuncle of the neck. No side effects were observed and there was no indication that the combination is toxic. Detailed data will be found below.

EXAMPLE 1

Human placenta, in amount of 1 kilogram, is contacted with aqueous ethyl alcohol (75 percent alcohol) of pH 2.7 at 20°–30 C. for 2 hours, the resulting material is allowed to stand in the cold, is filtered, and the filtrate is adjusted to pH 9.6, all as is described in the example of U.S. Pat. No. 2,907,695. The precipitate which is believed to be a magnesium phosphate complex is separated, and the treated solution, which contains the extract not precipitated upon addition of base, is subjected to further processing to provide additional medicinal values.

The treated solutiom is evaporated to dryness on a 100° C. water bath. Solute-extract is deposited from the solution. It is a dark brown, sticky substance, amount to 20 grams. 100 grams of this material is dissolved in 8 oz. of tap water at 130° F. A dark brown solution forms readily. It is pH 4.5. To this solution, 16 oz. of water and 500 grams of dibasic magnesium phosphate is added, and the solution is stirred well at room temperature for about 1 hour. Bubbling which indicates reaction, occurs. Then, 32 oz. of water at 130° F. are added and another 500 grams of dibasic magnesium phosphate is added, and stirring is continued for about 1 hour. The resulting solution is then allowed to stand at room temperature for 3 hours. The pH of the solution is then 7.0. The solution is then poured into a Pyrex evaporating disk and subjected to evaporation in an oven at 70° C. for 3 days. The resulting product is hard and stone like and of carmel color. This can be ground up with mortar and pestle to provide the medicinal values as a powder.

EXAMPLES 2–13

In each of a series of experiments, 100 grams of the brown solute-extract prepared in accordance with the process of Example 1 was dissolved in 500 cc.'s of 150° F. water so that the solution was clear. In each case, one kilogram of one of the alkaline earth metal or alkali metal salts noted below was then added (10 parts by weight of salt/weight part of solute) and thoroughly mixed. The mixture was then evaporated at a temperature of 55° C. for 3 days to form the medicinally acceptable salt complex of the present invention. The product was a hard stone-like material which was then ground to a powder with mortar and pestle.

TABLE 1

| Experiment | 2 | Calcium gluconate |
|---|---|---|
| " | 3 | Calcium lactate |
| " | 4 | Calcium dibasic phosphate |
| " | 5 | Calcium tribasic phosphate |
| " | 6 | Magnesium dibasic phosphate |
| " | 7 | Magnesium tribasic phosphate |
| " | 8 | Potassium chloride |
| " | 9 | Potassium gluconate |
| " | 10 | Sodium dibasic phosphate |
| " | 11 | Sodium lactate |
| " | 12 | Sodium salicylate |
| " | 13 | Strontium lactate |

To provide the medicinal value in a form suitable for parenteral administration 1 to 3, e.g., 2 grams of the foregoing salt complexes can be dissolved in 30 cc. of sterile normal saline solution (0.9 NaCl), preferably containing as preservative 0.5 percent benzyl alcohol and 0.01 percent butaben, by heating a mixture of the powder and water on a water bath at 100° C. for 35 minutes. Bubbling indicating reaction occurs during this time. The resulting solution is turbid and of pH 7.0.

EXAMPLE 14

To prepare a penicillin combination according to the invention, 15 cc. of the saline solution of placenta medicinal values made in Example 1 is admixed with 10 cc. of an aqueous medium containing 300,000 units per cc. of procaine penicillin G. After thorough mixing the material is left standing for 6 hours. Reaction occurs and true solution forms. The color of the solution is slightly greyish and the pH thereof is 7. This material is suitable for parenteral administration, and is stable at room temperature.

EXAMPLE 15

In a manner similar to that of Example 2, a penicillin combination is made using the product of U.S. Pat. No. 2,907,695 as shown in FIG. 1, thereof. 10 cc. of a normal saline solution containing 65 mg. of the placenta medicinal values of U.S. Pat. No. 2,907,695 were added to 10 cc. of aqueous procaine penicillin G solution (300,000 units per cc.), to provide a penicillin combination according to the invention.

EXAMPLES 16–27

1.5 grams each of the placenta derived salt complexes of Example 2–13 were dissolved in 30 cc. sterile normal saline solution with the resulting 5 percent solution being sterilized in a water bath. The solution in each case was allowed to cool to room temperature and mixed with equal parts of procaine penicillin solution. The admixture was allowed to stand for 3 hours at room temperature.

The new mixtures were used in the treatment of 35 patients who had a history of severe penicillin sensitivity and were severely allergic to penicillin therapy. The patients were treated by an intramuscular injection of 2 cc. of each of the foregoing mixture of penicillin and placenta extract derived material. The mixture was found to be non-allergic in every case in treating the 35 patients, even after repeated injections over a period of 6 to 8 weeks. There was no evidence of immediate or delayed sensitivity, either of a localized or generalized form. It is an accepted medical fact that penicillin allergy does not disappear spontaneously, and thus these experiments evidence the advantageous nature of the present invention.

The following illustrates the significant advantages afforded by combining the placenta-derived material of the present invention with penicillin in treating penicillin sensitive patients.

EXAMPLE 28

Placenta was contacted with aqueous ethyl alcohol in accordance with U.S. Pat. No. 2,907,695. Following contact at approximately room temperature, the admixture was allowed to stand in the cold to precipitate protein material. Ammonium hydroxide is then added to give a pH of 5.4. The admixture is allowed to stand overnight at 0° C. and white crystals came out of solution. The precipitated material was removed and the solution having the extract dissolved therein subjected to drying so as to recover a brown residue of placenta extract. 100 grams of this brown residue of placenta extract was dissolved in 1 liter of water at 140° C. 1 kilogram of magnesium phosphate (dibasic) was added to this solution. The materials were then mixed by stirring. Thereafter they were subjected to evaporation at 70° C. in an oven. When dry, the solids were removed from the oven. A 7 percent solution of the dry solids was made in normal sterile saline solution. The 7 percent solution was thereafter resterilized for 35 minutes at 100° C. in a water bath.

Procaine penicillin g. in aqueous suspension, and at a concentration of 300,000 units per cc. was stabilized with 0.2 percent methyl paraben and 1.04 percent propyl paraben. 10 cc.'s of the stabilized penicillin solution was admixed with 15 cc.'s of the 7 percent placenta extract solution. The admixture was shaken well and left at room temperature for 3 hours. Thereafter, patients were treated by an intramuscular injection of 2 cc.'s of a combination solution of penicillin and placenta extract (referred to as "New Penicillin Co.").

Table 2 sets forth the previous histories of the patients tested with respect to allergy to penicillin treatment and the results afforded by the practice of the present invention. As shown, patients with a marked penicillin allergy showed little or no allergy when treated with the penicillin-placenta extract of the present application.

TABLE 2
[Case reports on the use of a new penicillin compound]

| Patient | Age | Previous History | Present History | Follow-Up |
|---|---|---|---|---|
| 1. E.N. | 68 | Treated in 1961 (May) for pneumonitis with 6 penicillin inject. Developed severe urticaria after the last injection lasting two weeks. Warned never to take penicillin again. | January 1962 developed severe sore throat and follicular tonsillitis. Temp. 104° F. (Culture revealed *Streptococcus hemo'yticus*.) Received 2 cc. of New Penicillin Co. Temp. became normal in 12 hours. Uneventful recovery. No local and no general reaction to the New Penicillin Co. | Observed at 4-week, 8-week, and 12-week intervals. No signs of any local or systemic reaction. |
| 2. L.K. | 55 | In 1958 received a series of penicillin injections with no untoward reactions. The last injection left a large localized swelling. One year later she received another injection of penicillin. Within a few minutes she became acutely ill; severe swelling of arms, legs, face; shock; fell unconscious to the floor; hospitalized; treated with oxygen steroids; adrenalin; etc. Recovered after 10 days; residual dermatitis lasted three weeks. | In 1960 developed a severe infection and ulcer of the leg. (Culture showed a Staphylococcus infection.) She received 2 cc. of the New Penicillin Co. There was no local or constitutional reaction. She received 2 additional injections on alternate days without any signs of a local or general reaction. The infection healed rapidly. | After 12 weeks observation showed no signs of a delayed allergic reaction. |
| 3. D.K. | 25 M | 1959 received a penicillin injection for an infected ear and developed a severe skin reaction. Warned never to take penicillin again. | October 1960 developed a recurrence of the ear infection. (Culture revealed a Streptococcus hemolytic organism.) He received 1 cc. of the New Penicillin Co. No reaction; no penicillin sensitivity. 2 days later he received a similar dose. No local or general reaction. The ear ceased to drain; complete recovery. | No allergic manifestations evident at 6 weeks. |
| 4. B.T | 45 M | 1958—several penicillin injections with no reaction; August 1959 received 2 cc. procaine penicillin and went into shock; wheezing, cold sweat, convulsions and unconsciousness. Revived in the hospital but had a residual dermatitis for three weeks. | September 1960 carbuncle of neck. Received 2 cc. of the New Penicillin Co. No signs of any local or general sensitivity. Received a similar dose two days later. No reaction. He received a total of 4 injections of the New Penicillin Co. with no allergic reaction. The carbuncle healed rapidly. | No allergic manifestations evident at 6 weeks. |

TABLE 2

[Case reports on the use of a new penicillin compound]

| Patient | Age | Previous History | Present History | Follow-Up |
|---------|-----|------------------|-----------------|-----------|
| 5. J.N.... | 15 | Unable to take penicillin in any form. In November 1959 took a course of 8 tablets orally of a penicillin salt and developed a severe rash and fever lasting 7 days. In 1959 he had a similar reaction following a penicillin injection. | December 1960 he developed a severe penumonia of the upper and lower lobes of the left lung which he had for 5 days; temp. 104° F. He was given 2 cc. of the New Penicillin Co. and was observed for 1 hour. There were no signs of a general or local reaction. Two days later the chest was almost clear. He received a similar dose of the New Penicillin Co. Examination 3 days later; the patient had made a complete recovery. There was no allergic response to the new penicillin. | No signs of any allergy to the New Penicillin Co. at any time. |
| 6. L.U.... | 39 H.W. | October 1961 received an injection of procaine penicillin for a severe chronic sinusitis and headaches. Within twenty minutes she was covered from head to foot with giant urticaria (hives) which lasted four days. | She was not seen again until December 1961, and was hospitalized; nasal culture revealed a *Staphylococcus aureus* infection. She received 2 cc. of the New Penicillin Co. There was no local or systemic reaction to the New Penicillin Co. She had a total of four injections with no reaction at any time. The sinusitis cleared up completely. | No signs of any allergy to the New Penicillin Co. at any time. |

The following illustrate that a reaction takes place between the placenta extract and alkali or alkaline earth metal salt.

a. Whereas triple magnesium phosphate is not soluble in water at room temperature up to 140° C., when the placenta extract is added to it, it readily dissolves with considerable bubbling. These same observations occur with other relatively insoluble alkaline earth metal salts.

b. Whereas magnesium phosphate is white, the product obtained by reacting it with placenta extract was yellow and remained so after repeated washing.

c. The salt-placenta extract product is of greater density and crystallinity than either component alone, and has an aromatic odor not found in either of the individual components.

The following shows a reaction takes place between the salt-placenta extract material and penicillin.

a. If the penicillin and salt-placenta extract are admixed and the resultant material rapidly administered, the patient has an allergic reaction. However, if the components are allowed to inter-react, such as by standing for 24 hours, no such allergic reaction takes place upon administration.

b. When an equal amount of procaine hydrochloride in 25 percent aqueous solution is added to 1 million units of G powder penicillin dissolved in 5 cc. of normal saline solution at room temperature, a fine white precipitate is formed (conventional procaine penicillin effect). However, when 10 cc. of 0.7 percent solution of the product formed by adding magnesium phosphate to the placenta extract was added, the penicillin precipitate was reduced by one third.

It is noted in passing that the placenta-derived materials when combined with various other chemicals offer potential in treating various maladies. Thus, the brown residue solute extract described in Example 1 may be admixed with 25 parts by weight of the following materials, the admixture when administered in the form of 0.3 gram capsules taken three times a day having been found to give improvement in rheumatoid arthritis conditions.

A. Chemicals of the salicylate group, e.g., sodium salicylate, aspirin (acetyl salicylic acids).

B. The para-aminophenol type compounds, e.g., acetamilid and acetopheneditin.

C. The pyrazolon derivatives, e.g., antipyrine and aminopyrine.

Additionally, when put into solution the brown residue of Example 1 can be combined with various sulfonamide drugs, the sulfonamide drug being added to the solution, and then evaporation being effected to obtain a dry powder. It has been found that a dose of 0.3 grams every 8 hours has given a good clinical response in patients suffering from rheumatoid arthritis. Typical sulfonamide drugs are: fulfamerazine, sulfacetamide, sulfadiazine, sulfamethazine, sulfapyridine, sulfadimethoxine.

What is claimed is:

1. The method of producing an active penicillin composition of high tolerance which comprises contacting penicillin with effective amounts of a pharmaceutically acceptable salt complex of an extract of placenta dissolved in a solution medium, said complex being selected from the group consisting of (a) the salt complex derived by contacting placenta with an acidic aqueous alcoholic solvent to form an acidic extract containing active ingredients and precipitated placenta components and adding to soluble ingredients of said acidic extract a base to precipitate said salt complex and leave a soluble portion of said extract, and (b) the salt complex formed by adding to the soluble portion of said extract of (a) after addition of base a member of the group consisting of alkali metal salts and alkaline earth metal salts to form a salt complex thus precipitated from said soluble portion.

2. The process of claim 1 wherein a base is first added to the placenta extract solution to give an alkaline ph and effect precipitation of a medicinal product and provide a treated solution containing extract derived from the placenta, admixing said treated extract containing active ingredients with a salt of a metal selected from the group consisting of alkali and alkaline earth metals, to form a salt complex, whereby a second medicinal product is derived, and contacting penicillin with said second medicinal product.

3. The method of claim 1, wherein the salt complex is a phosphate complex.

4. The method of claim 1 wherein a reactant ratio of 2 to 30 mg of salt complex to 300,000 units of penicillin are employed.

5. The method of claim 2 wherein 10 to 5,000 weight percent of said metal salt based on solute not precipitated by said base is added to said treated extract.

6. As a substance, the reaction product formed by the process of claim 2.

7. The reaction product produced by the method of claim 5.

8. As a substance, the reaction product formed by contacting penicillin with effective amounts of a pharmaceutically acceptable salt complex of an extract of placenta dissolved in a solution medium, said complex being selected from the group consisting of (a) the salt complex derived by contacting placenta with an acidic aqueous alcoholic solvent to form an acidic extract containing active ingredients and precipitated placenta components and adding to soluble ingredients of said acidic extract a base to precipitate said salt complex and leave a soluble portion of said extract, and (b) the salt complex formed by adding to the soluble portion of said extract of (a) after addition of base a member of the group consisting of alkali metal salts and alkaline earth metal salts to form a salt complex thus precipitated from said soluble portion.

9. A substance as in claim 8, wherein the penicillin is procaine penicillin G.

10. A substance as in claim 8, wherein said metal salts are phosphate salts.

11. The reaction product of claim 8 formed by contacting reactants in the ratio of at least 2 mg of salt complex to 300,000 units of penicillin.

12. A substance, as in claim 8, formed as the reaction product of contacting penicillin and a magnesium phosphate complex derived by steps comprising contacting placenta with an acidic aqueous alcoholic solvent to provide a solution of an extract containing active ingredients from the placenta dissolved in the solvent and leave a portion of the placenta undissolved as a placenta residue, and adding base to the solution of the extract to give an alkaline ph and to precipitate said magnesium phosphate complex.

* * * * *